United States Patent [19]

Higashino

[11] Patent Number: 4,695,932
[45] Date of Patent: Sep. 22, 1987

[54] SUPERCONDUCTIVE ENERGY STORAGE CIRCUIT

[75] Inventor: Shigenori Higashino, Hyogo, Japan

[73] Assignee: Mitsubishi Denki Kabushiki Kaisha, Tokyo, Japan

[21] Appl. No.: 832,759

[22] Filed: Feb. 25, 1986

[30] Foreign Application Priority Data

May 15, 1985 [JP] Japan .................................. 60-101436

[51] Int. Cl.$^4$ ............................................ H02M 7/00
[52] U.S. Cl. ...................................... 363/14; 363/124
[58] Field of Search ....................... 363/35, 37, 86, 87, 363/89, 124, 129, 14

[56] References Cited

U.S. PATENT DOCUMENTS 4,122,512 10/1978 Peterson et al. ...................... 363/14

OTHER PUBLICATIONS

Variable-Frequency Inverter and Its Application to Motor Drives by Miller et al. Electronics and Power, Oct. 1976, pp. 675-678.
Boom et al., "Superconductive Energy Storage for Power Systems", IEEE Transaction on Magnetics, Sep. 1972, pp. 701-703.
R. D. Turner, "Superconductive Magnetic Energy Storage for Electric Power System Stabilization", American Chemical Society, 1979, pp. 494-499.
Peterson et al., "Superconductive Energy Storage Inductor-Converter Units for Power Systems", IEEE Transactions on Power Apparatus and Systems, Jul.-/Aug. 1975, pp. 1337-1346.
Koyama, "How to Take-in/Take-out Electric Power", Electron Engineering General Institute, 1981, pp. 81-84.
Gyugyi, "Reactive Power Generation and Control by Thyristor Circuits", Westinghouse Electric Corporation, 1981, pp. 1-11.

Primary Examiner—Peter S. Wong
Assistant Examiner—Judson H. Jones
Attorney, Agent, or Firm—Bernard, Rothwell & Brown

[57] ABSTRACT

A circuit for storing energy delivered from an AC supply comprises a DC capacitor and a reversible chopper between an AC/DC reversible conversion circuit connected to the AC supply and a current supply circuit including a superconductive coil. This capacitor is connected intermittently to the superconductive coil in response to the action of the reversible chopper, so that when connected it delivers energy to the superconductive coil or receives energy therefrom. The reversible chopper circuit controls in accordance with required values the magnitude of transfer of energy between the DC capacitor and the superconductive coil.

6 Claims, 10 Drawing Figures

SUPERCONDUCTIVE ENERGY STORAGE CIRCUIT

BACKGROUND OF THE INVENTION

1. Field of the Invention

This invention relates to a superconductive energy reversible storage circuit for alternating current power systems.

2. Description of the Prior Art

It is desirable that a nuclear power plant or large-scale steam-power station be controlled to run at a steady output. On the other hand, in general, demand for power markedly decreases at night. In order to avoid such unbalance between supply and demand of power, there has been a requirement for developing power storage equipment. Under the circumstance, one such equipment drawing attention is a superconductive energy storage system with a superconductive magnet.

There has already been known a superconductive energy storage system, which was disclosed in U.S. Pat. No. 4,122,512, Peterson et al. FIG. 7 illustrates the circuitry of this system. In FIG. 7 reference numeral 1 designates an alternating current input terminal connected to an AC power supply line; 2 a three-phase AC/DC reversible converter circuit consisting of thyristors; 3 a superconductive coil short-circuit switch; 4 a superconductive energy storage coil; 5 a refrigeration system for the superconductive energy storage coil 4; 21 a commutation reactance of the three-phase AC/DC conversion circuit; 22 a thyristor bridge circuit of the three-phase AC/DC reversible converter circuit 2; and 23 a phase control circuit for controlling energy flow through three-phase AC/DC reversible converter circuit 2.

The mode of operation will be described below:

Referring to FIG. 7, a reversible converter acting as three-phase AC/DC reversible converter circuit 2 is connected at the AD input terminal 1 to an energy source, and the phase control circuit 23 controls the flow of energy between a three-phase AC supply line and the superconductive energy storage coil 4 by adjusting the phase difference between AC supply voltage and the circuit current.

The circuit current delivers energy from a power supply line to the superconductive energy storage coil 4 when it has a delayed phase compared with the power supply voltage, and releases energy in the opposite direction when its phase is adjusted to be advanced.

When set to zero power-factor control, energy remains stored by the superconductive energy storage coil 4. Besides it is possible to separate coil current through the superconductive energy storage coil from the AC supply by closing of the superconductive coil short-circuit switch 3 which results in bypassing the thyristor bridge circuit 22.

Also reference numeral 5 indicates a refrigeration system for refrigerating the superconductive energy storage coil 4. The commutation reactance 21 is applied in the case where the thyristor bridge circuit 22 is a line commutated converter.

Because of the construction of the superconductive energy storage circuit so that current through the energy storage coil flows through the three-phase AC/DC reversible converter circuit and then the three-phase AC supply line, the current ratings of the AC supply line equipment and the thyristor converter had to be designed to be a maximum value of coil current. Owing to this, the current capacity of the AC-side parts of the superconductive coil energy storage circuit did not correspond to a service power established on the basis of the current rating of the coil, inevitably reflecting in large-scale loss. This is a problem encountered in the prior art.

SUMMARY OF THE INVENTION

It is the principal object of the present invention to solve the above-mentioned problem, and thus to provide a superconductive energy storage circuit permitting not only scale-down of the current capacity of the AC-side section in accordance with service power but also reduction of operation loss.

The superconductive energy storage circuit according to the invention comprises a DC capacitor between an AC/DC reversible converter circuit and an energy storage coil, and a reversible chopper circuit connected in parallel to the DC capacitor and controlling the coil current flow. Through the intermediation of the DC capacitor and reversible chopper circuit, interface of the voltage source circuit and the current source circuit including a superconductive coil is completed, and thereby the current capacity of the AC-side parts can correspond to service power.

In this invention, the DC capacitor is intermittently connected to the superconductive coil by the action of the reversible chopper circuit which controls the coil current flow, and thereby acts so that energy is delivered to and released from the superconductive coil. The reversible chopper circuit performs such control that the current circuit of superconductive coil will not open, and voltage between the terminals of the superconductive coil is a desired constant value on the average, and thus enables the magnitude of delivery and release of energy to follow command value.

BRIEF DESCRIPTION OF THE INVENTION

DETAILED DESCRIPTION OF THE PREFERRED EMBODIMENTS

Figure 1:
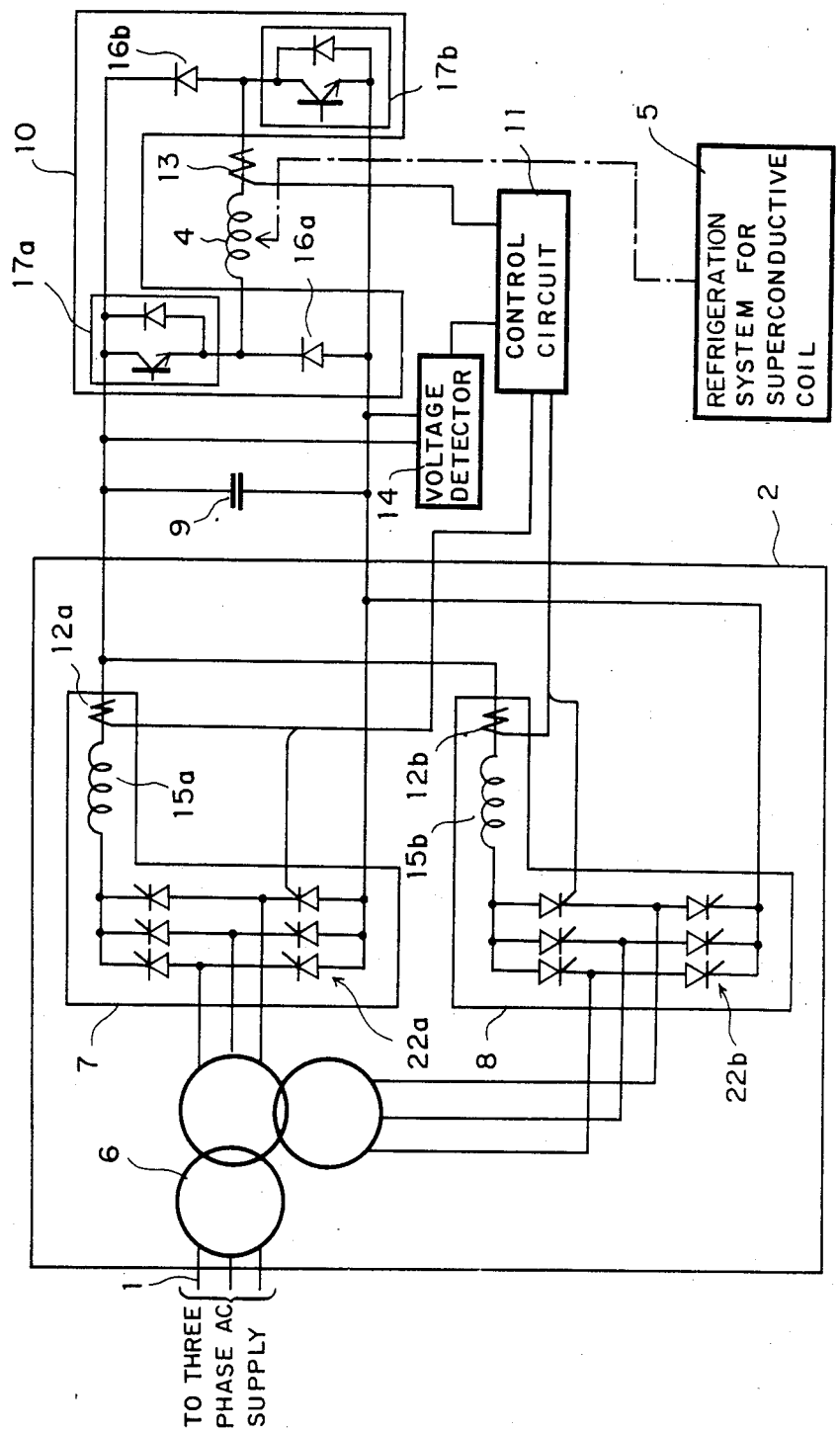
FIG. 1 is a block circuit diagram of a superconductive energy storage circuit according to the present invention.
Figure 7:
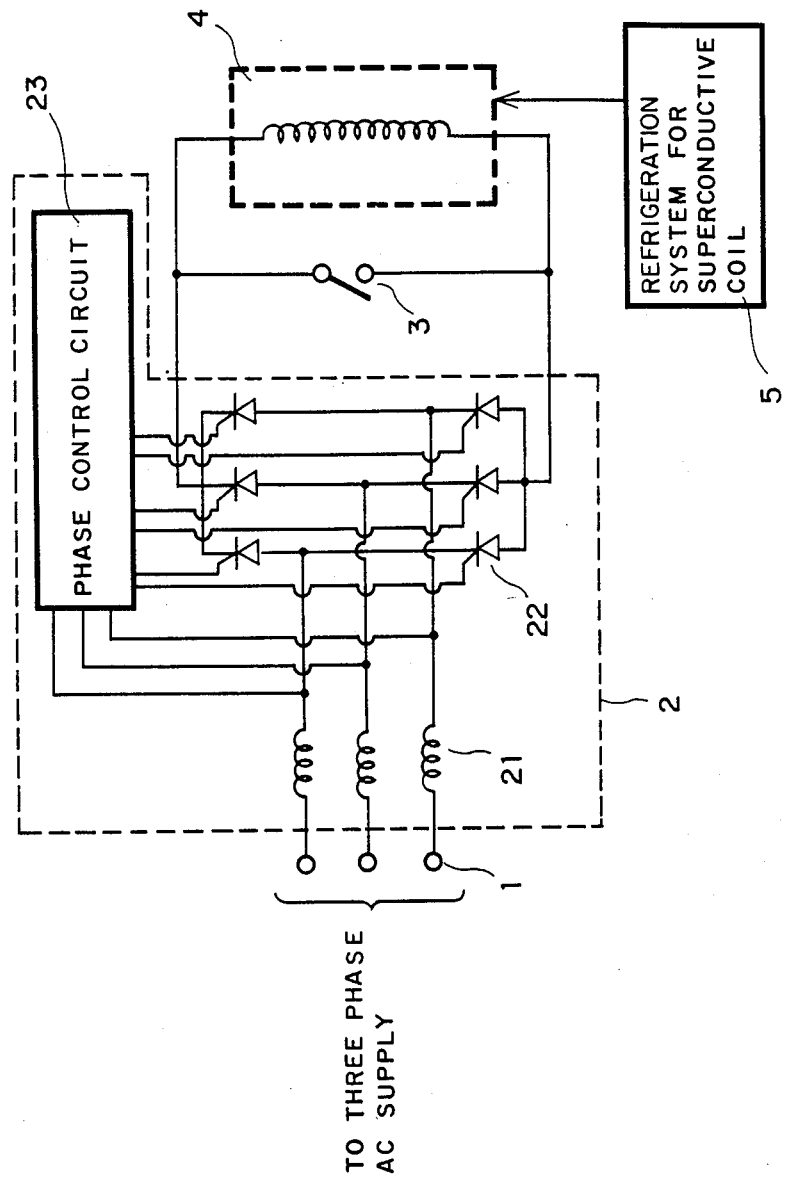
FIG. 7 is a block circuit diagram of a known superconductive energy storage system.

Embodiments of the invention will be described with reference to the accompanying drawings hereinafter:

In FIG. 1, components corresponding to those shown in FIG. 7 are designated by the same reference numerals. Reference numeral 4 designates a superconductive energy storage coil connected to the reversal chopper circuit 10; 5 a rerefrigeration system for the superconductive energy storage coil 4; 6 an isolating transformer; 7 an AC/DC converter circuit; 8 a DC/AC converter circuit; 9 a DC capacitor connected to the AC/DC converter circuit 7; 10 a reversible chopper circuit connected in parallel to the DC capacitor 9; 11 a control circuit for the energy storage circuit; 12a and 12b current detector; 13 a coil current sensor; 14 a voltage detector for the DC capacitor 9; 15a and 15b DC reactors; 16 diodes; 17a and 17b switch elements of the reversible chopper circuit 10; and 22a, 22b thyristor bridge circuits constituting an AC/DC converter.

In the following, the operation will be described:

The circuit action is performed in three modes: first (FIG. 2a) in which energy is delivered into a coil, second (FIG. 2c and 2d) in which energy remains stored in the coil, and third (FIG. 2b) in which energy is released from the coil.

Figure 2:
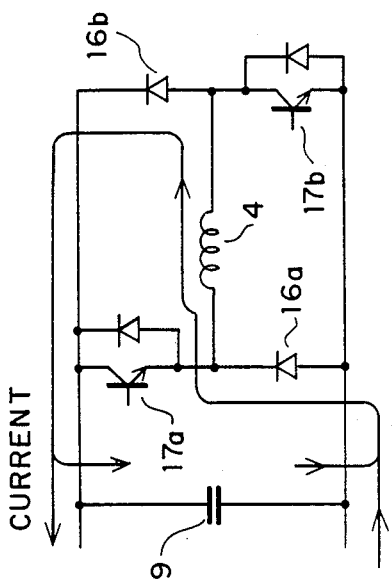
FIGS. 2a through 2d are circuit diagrams illustrating current flow paths of different modes in the circuit of FIG. 1.
Figure 2:
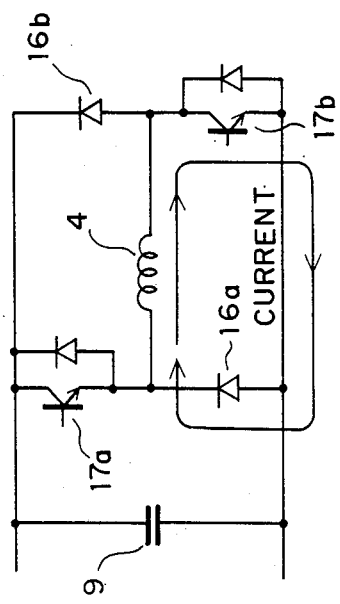
Figure 2:
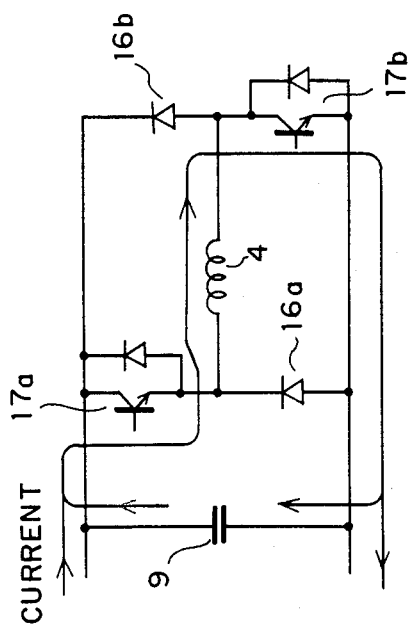
Figure 2:
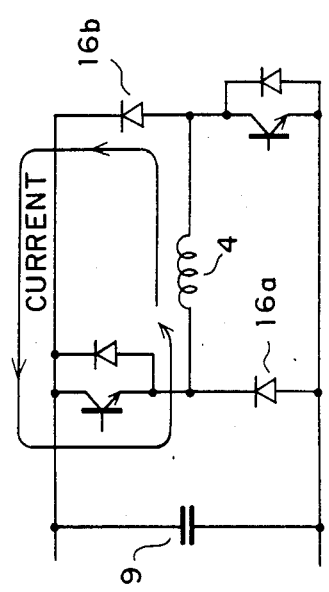

In the first mode, the reversible chopper circuit 10 causes the drop in accumulated voltage of DC capacitor 9, when viewed as mean level in response to opening and closing of switch elements 17a, 17b so that energy is delivered in the direction of the arrow in FIG. 2a to the superconductive energy storage coil 4. The AC/DC converter circuit 7 performs control under which the mean value of the terminal voltage of the capacitor is higher than the voltage of the superconductive storage coil, Ldi/dt to, supply power from the AC supply to the DC capacitor 9.

Then the DC/AC converter circuit 8 may be in quiescent state. When the superconductive energy storage coil 4 is connected to the DC capacitor 9 via the reversible chopper circuit 10, branch current flow through the DC capacitor 9 and the AC/DC converter circuit 7 occurs, and this makes it unnecessary for the three-phase AC/DC reversible converter circuit 2 to have the coil current capacity, and thus only equipment of a scale meeting service power is required.

In the second mode shown in FIGS. 2c and 2d, the reversible chopper circuit 10 takes an action to establish a current circulation indicated by the arrow, with the maintenance of alternating closed state of the circuit by the alternating action of either switch element 17a or 17b. At the same time, the three-phase AC/DC reversible converter circuit 2 acts to keep the voltage of the DC capacitor 9 in accordance with the next action mode. In this case, the three-phase AC/DC reversible converter circuit 2 is separated from the coil current; thus a highly efficient state is established which is attended with no loss that otherwise may result from the current flowing through the converter circuit.

In this mode, coil current does not flow through the AC circuit, and so there is an additional effect of improving the power-factor of the energy storage circuit when viewed from the AC circuit side.

In the third mode, the reversible chopper circuit 10 acts as a boosting chopper circuit in such a way that energy stored in the superconductive energy storage coil 4 is released to the DC capacitor 9, and the terminal voltage of the DC capacitor 9 is controlled to the value conformed to the action of the DC/AC converter circuit 8.

The DC/AC converter circuit 8 performs the reversible conversion process into alternating current to release electric energy stored in the superconductive energy storage coil 4 to the AC supply through the DC capacitor 9. In this mode, the AC/DC converter circuit 7 may be in a quiescent state.

When the superconductive energy storage coil 4 is connected to the DC capacitor 9 through the reversible chopper circuit 10, as shown in FIG. 2b, branch current flow through the DC capacitor and the DC/AC converter circuit 2 occurs, and therefore it becomes unnecessary for the three-phase AC/DC reversible converter circuit 2 to have coil current capacity in the same manner as in the above-mentioned mode 1; this allows equipment of a scale meeting service power. The circuit of the above embodiment permits the adjustment of the AC input power-factor during action of the three-phase AC/DC reversible converter circuit 2 by controlling the voltage of the DC capacitor 9 in accordance with action mode or operation conditions, providing the possibility to use additionally the reactive power adjusting function.

Figure 3:
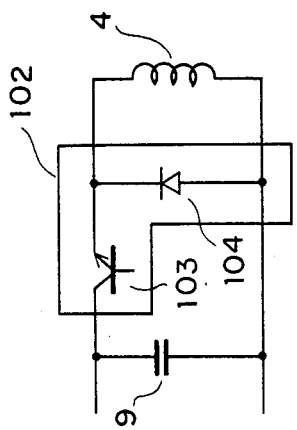
FIG. 3 is an alternative AC/DC converter circuit usable for energy storage circuits of the invention.

Instead of a thyristor bridge circuit 22a and a DC reactor 15a used as the three-phase AC/DC converter circuit 7 in the above-described embodiment diagrammed in FIG. 1, a boosting chopper circuit illustrated in FIG. 3 can be used. In the boosting chopper circuit 71, one terminal of the DC reactor 15a is connected to one output terminal of an AC/DC converter, that is, diode bridge 41, and the other terminal to one terminal of the capacitor 9 through the collector electrode of the transistor 72 controlled by external signals and to the other terminal of the capacitor 9 through diode 73. The emitter electrode of the transistor 72 is connected to the other terminals of the diode bridge 41. The configuration of the boosting chopper circuit is known in itself.

Figure 4:
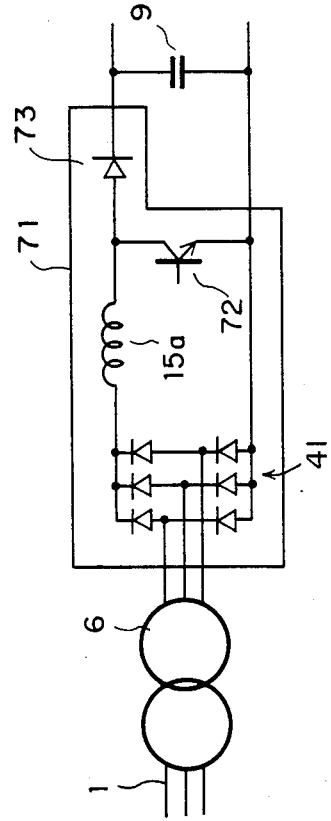
FIG. 4 is a three-phase AC/DC converter circuit usable for energy storage circuits of the invention.

The use of a voltage-type inverter 31 having a known configuration as the three-phase AC/DC reversible converter circuit 2 shown in FIG. 4 enables a dual function of both forward and reversal conversion to be performed. In this case, control of effective power on the basis of phase difference between the AC supply voltage and the inverter voltage and also control of reactive power through the impedance of the isolating transformer 6 are possible.

Figure 5:
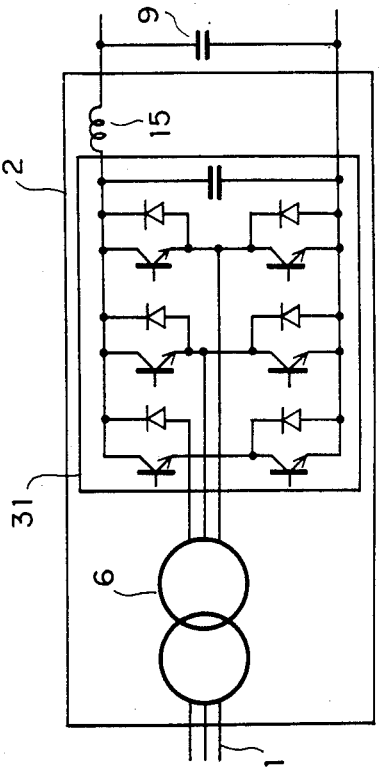
FIG. 5 is an alternative reversible chopper usable for energy storage circuits of the invention.

Another alternative chopper 101 is diagrammed in FIG. 5, which is composed of four reversal-conductive switch elements 51a, 51b, 51c and 51d, each having a structure of a bridge circuit. This configuration corresponds to substitution for diodes 16a, 16b of the reversible chopper 10 shown in FIG. 1 as reversal conductive elements, and thus enables control of reversible current flow in either direction into or out of the superconductive energy storage coil 4, and hence can be applied to a usage in which a magnetic field produced in the coil is used.

Figure 6:
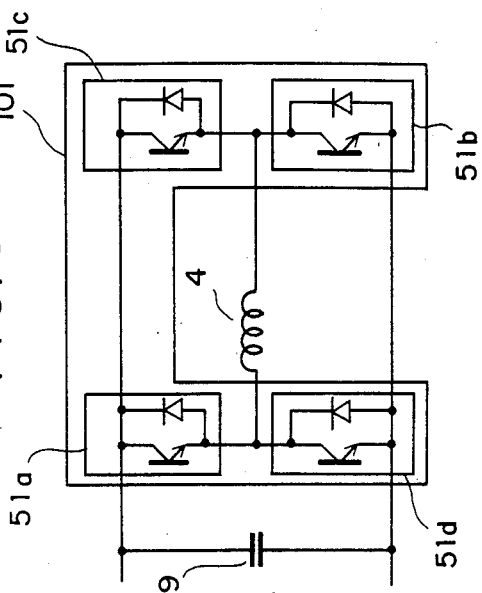
FIG. 6 is another alternative chopper usable for energy storage circuits of the invention.

In FIG. 6 is shown a modified chopper 102 which can be used in a non-reversible application wherein only energy storage in the coil 4 is performed for the purpose of, for instance, employing the magnetic field. The chopper 102 comprises a transistor 103 controlled by external signals, the collector electrode of the transistor 103 being connected to one terminal of the capacitor 9 and the emitter being connected to one terminal of the coil 4, respectively, and a diode 104 connected between the terminals of the coil 4 so that the cathode of it is connected with the emitter of the transistor 103. The chopper is advantageous in the respects: it can be realized with a few parts, and permits energy storage at a high efficiency and with minimized danger of undesired energy release.

In addition, in all the embodiments described above, there may be provided a short-circuit switch parallel to the superconductive energy storage coil, like the prior art switch 3 diagrammed in FIG. 7.

As above-described, according to the invention, there is further provided a DC capacitor and a chopper circuit between the AC/DC reversible converter circuit and the superconductive energy storage coil, in such circuit configuration that the capacity of the AC-side equipment is based not on capacity of flowing through current but on service power, and this has the advantage of needing small-size equipment and simple wiring, and therefore provides easier handling and inexpensiveness.

What is claimed is:

1. A superconductive energy storage circuit comprising an AC/DC converter circuit connected to an AC supply line and capable of controlling an output current, a DC capacitor connected between the terminals of the DC output of said AC/DC converter circuit, a chopper circuit connected in parallel to said DC capacitor, and a superconductive energy storage coil connected to the output of said chopper circuit, said AC/DC converter circuit having a current capacity selected to meet the electrical energy transferral requirements between said AC supply line and said superconductive energy storage coil.

2. A superconductive energy storage circuit of claim 1, wherein said AC/DC converter circuit is reversibly controllable, and said chopper circuit is reversibly controllable.

3. A superconductive energy storage circuit of claim 1, wherein one or both of said AC/DC converter circuit and said chopper circuit are connected in parallel to said DC capacitor.

4. A superconductive energy storage circuit comprising an AC/DC converter circuit connected to an AC supply line and capable of controlling an output current, a DC capacitor connected between the terminals of the DC output of said AC/DC converter circuit, a chopper circuit connected in parallel to said DC capacitor, and a superconductive energy storage coil connected to the output of said chopper circuit, said AC/DC converter circuit consisting of a voltage-type inverter circuit, and delivery and release of energy from or to the AC supply unit being controlled on the basis of difference between the voltage phase of said voltage-type inverter circuit and the voltage phase of the AC supply line.

5. A superconductive energy storage circuit of claim 1, wherein when said AC supply line becomes exhausted, said inverter circuit acts to release energy from said superconductive coil to AC supply line.

6. A superconductive energy storage circuit comprising an AC/DC converter circuit connected to an AC supply line and capable of controlling an output current, a DC capacitor connected between the terminals of the DC output of said AC/DC converter circuit, a chopper connected in parallel to said DC capacitor, a superconductive energy storage coil connected to the output of said chopper circuit, and means for changing the voltage of said DC capacitor in accordance with operation mode or operation conditions, thereby to control reactive power of the AC supply line.

* * * * *

UNITED STATES PATENT AND TRADEMARK OFFICE
CERTIFICATE OF CORRECTION

PATENT NO. : 4,695,932

DATED : September 22, 1987

INVENTOR(S) : Shigenori Higashino

It is certified that error appears in the above-identified patent and that said Letters Patent is hereby corrected as shown below:

Column 3, line 4, "detector" should be --detectors--;

line 6, "16" should be --16a and 16b--;

line 24, delete the comma after "to" and insert a comma after "dt".

Signed and Sealed this

Twenty-third Day of February, 1988

Attest:

DONALD J. QUIGG

Attesting Officer

Commissioner of Patents and Trademarks